May 12, 1970 — M. K. JUCHHEIM — 3,511,096
GLASS CONTACT THERMOMETER
Filed April 12, 1968 — 3 Sheets-Sheet 1

Inventor
MORITZ KURT JUCHHEIM

May 12, 1970      M. K. JUCHHEIM      3,511,096
GLASS CONTACT THERMOMETER
Filed April 12, 1968      3 Sheets-Sheet 2
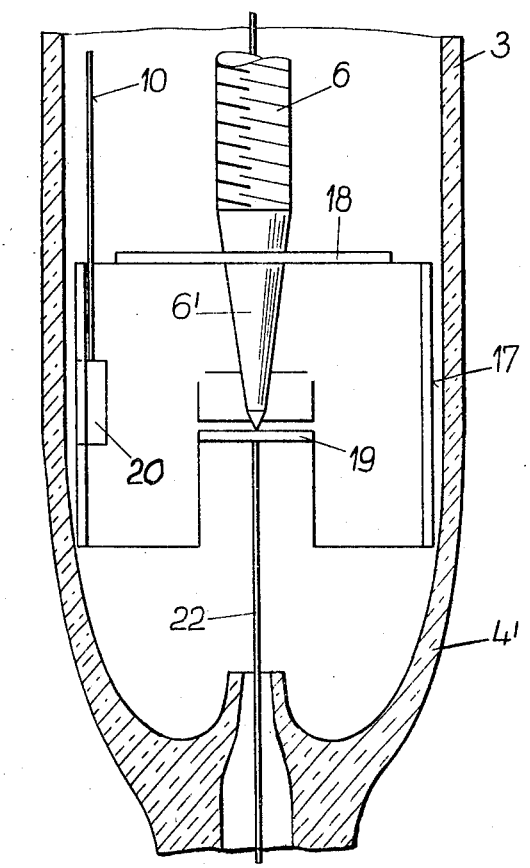
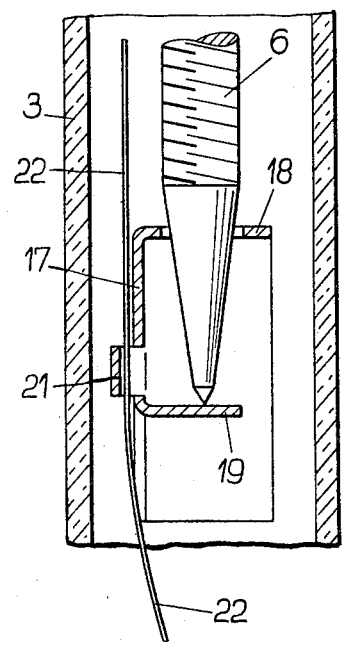
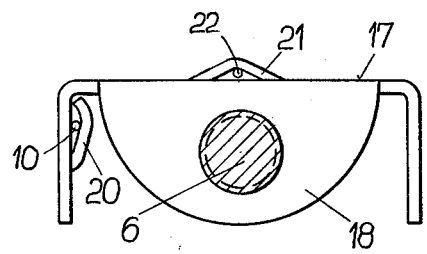
Inventor
MORITZ KURT JUCHHEIM
Lowry, Rinehart & Markva

United States Patent Office 3,511,096
Patented May 12, 1970

3,511,096
GLASS CONTACT THERMOMETER
Moritz Kurt Juchheim, 13–31 Moltkestrasse,
Fulda, Germany
Filed Apr. 12, 1968, Ser. No. 720,996
Int. Cl. G01k 1/02, 5/04
U.S. Cl. 73—371                               15 Claims

ABSTRACT OF THE DISCLOSURE

This disclosure provides a glass contact thermometer for sensing the level of a column of mercury in a capillary tube to control and/or limit temperature. The thermometer includes a glass tube that is mounted on top of the capillary tube. A lead screw is rotatably mounted within the glass tube and is supported at the lower end thereof by a support means. A traveling nut is located on the lead screw to move longitudinally with respect thereto. A contact wire extends from the upper end to the lower end of the glass tube. A connection means is provided to effect sliding contact between the traveling nut and the contact wire. An electrical contact member extends from the traveling nut into the capillary tube to sense the level of the mercury therein.

BACKGROUND OF THE INVENTION

This invention relates to a glass contact thermometer of the kind containing a movable electrical contact for sensing the level of a mercury column in a capillary tube, for the purpose of temperature control and/or temperature limitation.

Glass contact thermometers containing a sensing contact element movable by the operation of a rotary magnet are normally so contrived that a non-rotatable travelling nut on a lead screw in a glass tube surmounting the capillary tube carries a sensing wire which is attached to the travelling nut and which makes or breaks contact with the column of mercury in the capillary tube to close or open an electrical circuit as the level of the column of mercury rises and falls. In conventional contact thermometers which are adjustable by means of a rotary magnet, a sliding contact is provided between the capillary tube and the glass tube surmounting the capillary tube, said sliding contact consisting of a wire coil usually inserted in a curved capillary constriction for guiding the sensing wire made of platinum, the current supply lead being fused into the glass on this point. If the curvature of the manually produced constriction is excessive the sensing wire may be considerably strained and if it is too shallow contact may be intermittent and the thermometer is then useless. Moreover, in conventional forms of construction the end of the lead screw carrying the travelling nut is provided with a pointed end resting on a ceramic or solid metal seating, whereas at the top the lead screw has an extension seated on a glass plate fused into the oval section tube.

From the production point of view these bearings take considerable time to make. Splinters of ceramic seatings and particles from solid metal seatings unavoidably foul the capillary.

SUMMARY OF THE INVENTION

It is the object of the present invention to eliminate these and other drawbacks of the conventional contact thermometers.

To attain this object the present invention provides a glass contact thermometer containing a movable electrical contact for sensing the level of a column of mercury in a capillary tube for purposes of temperature control and/or temperature limitation, which comprises a travelling nut on a lead screw rotatable by a rotary magnet and a fixed sliding contact wire which extends from the upper end of a glass tube surmounting the capillary tube and containing the lead screw and the travelling nut, past or through the travelling nut to or beyond the seating or bearing supporting and locating the bottom end of the lead screw, and which provides a continuous electrical connection to the travelling nut by making sliding contact with the travelling nut itself or with a slipper element attached to the nut.

The advantages afforded by the proposed form of construction primarily consist in that the fixed sliding contact wire may be relatively robust and not liable to suffer wear or deformation, that the entire instrument can be reduced in overall length and that the bearings and locating means of the lead screw are free from the shortcomings of conventional bearings.

BRIEF DESCRIPTION OF THE DRAWINGS

Several embodiments of the invention will now be described by way of example and with reference to the accompanying drawings in which:

FIG. 5 is an axial section, on a considerably enlarged scale, of a bearing cage for the bottom end of the lead screw;

FIG. 6 is a top plan view of the lower bearing cage according to FIG. 5;

FIG. 7 is a fragmentary axial section of the lower bearing cage according to FIG. 5, the section being taken in a plane perpendicular to the axial section shown in FIG. 5;

DESCRIPTION OF THE PREFERRED EMBODIMENTS

Figure 1:
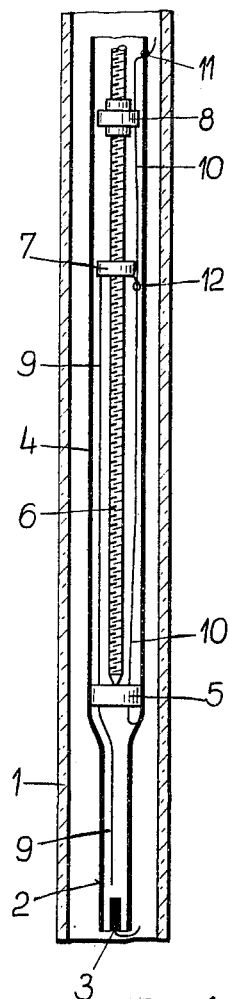
FIG. 1 is an axial section through a section of a contact thermometer according to the invention.

FIGS. 1 to 4 show an outer thermometer tube 1 which encloses in a manner known per se a capillary tube 2 containing a column of mercury 3 which indicates the temperature of the surroundings. This capillary tube 2 is directly surmounted by a glass tube 4 containing means for sensing and reporting a desired temperature. This glass tube 4 contains a lead screw 6 with a pointed bottom end that rests on a seating 5. A travelling nut 7 works on the lead screw 6 and can be raised and lowered but not rotated, since the cross section of the tube 4 is oval. Near its upper end the lead screw 6 runs in a fixed bearing 8. In a known manner the lead screw 6 can be rotated by a rotary magnet which is not shown in the drawing, but which is understood to be located at the upper end of the lead screw 6. The travelling nut 7 can thus be adjusted by reference to scale divisions likewise not shown. Affixed to the travelling nut 7 is an electrically conducting sensing wire 9 which extends down the tube 4, through the lead screw seating 5 into the capillary tube 2 to close an electric circuit when the lower end of the sensing wire 9 makes contact with the column of mercury 3. A relatively robust sliding contact wire 10 is provided in the tube 4 and passes to the outside at 11 through the wall of the tube 4 into which the wire is fused. Inside the tube 4 the sliding contact wire 10 may extend slidably through the body of the travelling nut 7 or, as shown in FIGS. 1 to 4, it may pass down one side of the travelling nut 7 and extend into the neck joining the tube 4 to the capillary tube 2 but at least to or into the seating 5 of the lead screw 6. This sliding contact wire 10 maintains permanent electrical contact with the travelling nut 7 by passing slidably either through the body of the travelling nut 7 or through a slipper element in the form of a single wire loop 12 or the like attached to the travelling nut 7 in such a manner that continuous and reliable contact between said travelling nut 7 and said sliding contact wire 10 is ensured. Conveniently the sliding contact wire 10 may be kept under slight axial compression and its bottom end bent into a terminal loop to offer a given degree of frictional resistance to unwanted displacement. It is self-evident that instead of a single wire loop also a multiple wire loop may be used.

Figure 2:
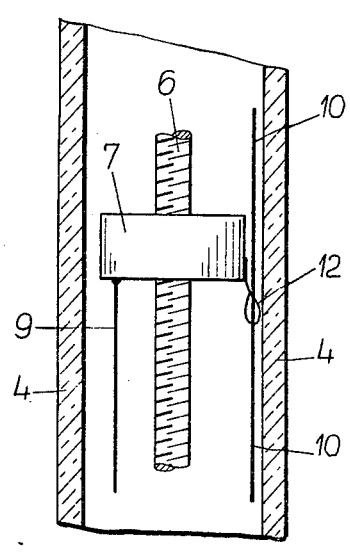
FIG. 2 is an elevational view, on an enlarged scale, of the travelling nut cooperating with a sliding contact wire through the intermediary of a slipper element.

The wire loop 12 which is shown in FIGS. 1 and 2 embraces the sliding contact wire 10 and makes two-point sliding contact with the sliding contact wire 10.

Figure 3:
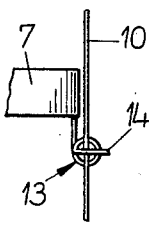
FIG. 3 is a similar view of another embodiment of the slipper element for maintaining contact between the sliding contact wire and the travelling nut.
Figure 4:
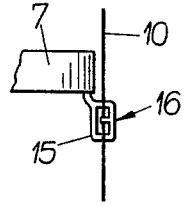
FIG. 4 is a similar view of a third embodiment of the slipper element in the form of a small sheet metal stamping.

However, it is possible and usually better to provide a slipper element which by spring action maintains three points of contact in order to obtain a current-conducting contact without clearance. To achieve this end a spring wire loop 13 may be formed by combining a wire ring with a spring-elastic diagonal web 14 as shown in FIG. 3 or, alternatively, a sheet metal stamping 15 provided with a sprung transverse web 16 as shown in FIG. 4 may be used as a slipper element. Such arrangements will ensure satisfactory current-conducting contact even in instruments subject to vibration.

In the embodiment according to FIGS. 5, 6 and 7 the bottom end of the lead screw 6 is held in a lower bearing cage 17 which has a rectangular or oval cross section and is thus located in the oval glass tube 4 so that it cannot rotate. The lower bearing cage 17 rests on the converging walls 4$^1$ at the bottom end of the glass tube 4. This lower bearing cage 17 is a sheet metal member, preferably consisting of V2A steel, of rectangular, oval or some alternative appropriate cross section. The upper part of the rear wall of the lower bearing cage 17 is bent forward and forms a lug 18 with a hole through which the pointed bottom end or tip 6$^1$ of the lead screw 6 passes, and which thus locates said lead screw and prevents lateral displacement. Below the tip 6$^1$ of the lead screw 6 the bottom end of the rear wall of the lower bearing cage 17 is likewise bent forward to provide a seating surface 19 for supporting the tip 6$^1$ of the lead screw 6 and providing endwise location. Preferably the tip 6$^1$ has a slightly blunted nose to minimize wear and also to prevent the tip 6$^1$ from biting into its seating. The resultant location afforded by this lower bearing cage 17 to the tip 6$^1$ of the lead screw 6 is extremely effective.

Moreover, the presence of the lower bearing cage 17 also permits the end of the sliding contact wire 10 to be securely clamped to the bearing cage 17, for instance in a clamping lug 20 cut and bent out of the side wall or some other part of the bearing cage 17. This method of securing the bottom end of the sliding contact wire 10 is simple and requires less time to accomplish than that of pinning the wire to the screw seating as was hitherto done. Moreover, there is absolutely no risk of the capillary tube being fouled, as was unavoidably the case in the past.

Moreover, the described lower bearing cage 17 for the lead screw 6 also permits an eyelet-like holder 21 to be stamped preferably centrally out of the back of the bearing cage 17 for guiding the sliding contact wire 10 or the sensing wire 22. In the past this could not be done, since the bearings were of ceramic or solid metal construction. It is in fact a considerable advantage to provide additional guide means for the sensing wire which extends from the travelling nut 7 into the capillary tube 2, particularly at the point where the wire bends before entering the capillary tube 2, since this additional location definitely eliminates error in relating the preset temperature to the actual temperature reading. The absence of intermediate guide means for a long sensing wire necessarily introduces the possibility of such errors.

Figure 8:
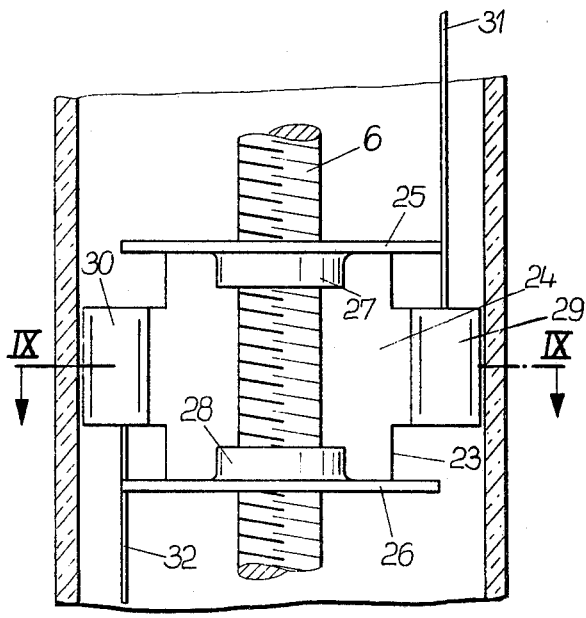
FIG. 8 is an axial section of a bearing cage at the upper end of the lead screw, likewise greatly enlarged.
Figure 10:
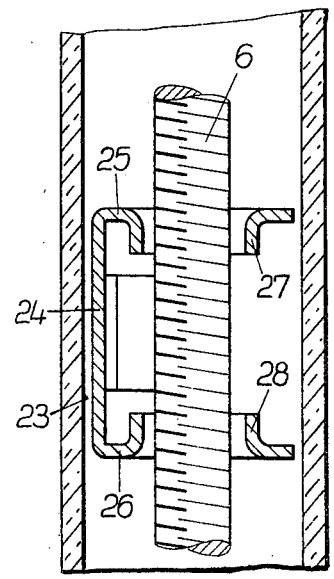
FIG. 10 is an axial section taken in a plane perpendicular to the section shown in FIG. 8.
Figure 9:
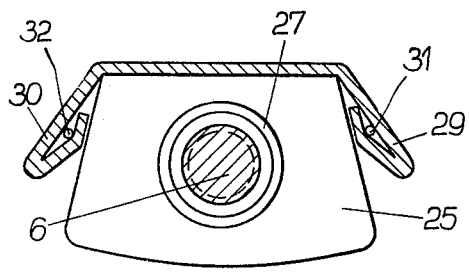
FIG. 9 is a top plan view of FIG. 8.

The upper end of he lead screw 6, as shown in FIGS. 8 to 10, is held in an upper bearing cage 23 of sheet metal construction in the form of a U-shaped member placed with its back wall 24 parallel to the lead screw 6 and having bearing bosses 27 and 28 which are punched into the two shanks 25 and 26 of the U for the reception of the stem of the screw 6. Clamping lugs 29 and 30 are integrally formed out of the sheet material of the back wall 24 or of some other part and project from one or both sides of the upper bearing cage 23. The lug on one side serves for securing a current supply lead 31 and that on the other side for securing a sliding contact wire 32 or the sliding contact wire 10. If desired, both wires 32 and 31 could be fixed in one and the same clamping lug. The ends of the wires are held in a clamping grip, a method of attachment which has the previously described advantages, besides being simple to provide, clean to manufacture and reliable in effect.

The invention may be embodied in other specific forms without departing from the spirit or essential characteristics thereof. The present embodiments are therefore to be considered in all respects as illustrative and not restrictive.

What is claimed is:

1. A glass contact thermometer for sensing the level of a column of mercury in a capillary tube to control and/or limit temperature comprising:
    (a) a glass tube having an upper end and a lower end and being mounted on top of the capillary tube,
    (b) bearing means rotatably mounting a lead screw within the glass tube,
    (c) support means located at the lower end of the glass tube to locate the lower end of the lead screw thereon,
    (d) a traveling nut located on said lead screw to move longitudinally with respect to the lead screw,
    (e) means fixedly mounting a contact wire within the glass tube,
    (f) said contact wire extending from the upper end to the lower end of the glass tube,
    (g) connection means to effect sliding contact between the traveling nut and the contact wire, and
    (h) an electrical contact member extending from the traveling nut into the capillary tube to sense the level of mercury therein.

2. A thermometer as defined in claim 1 wherein said connection means includes a hole in said traveling nut through which the fixed contact wire extends and maintains electrical contact therewith.

3. A thermometer as defined in claim 1 wherein said connection means includes a slipper element attached to the traveling nut, said element being in sliding contact with the contact wire.

4. A thermometer as defined in claim 3 wherein said slipper element comprises a wire loop structure having a spring-elastic diagonal web through which passes the fixed contact wire.

5. A thermometer as defined in claim 3 wherein said slipper element comprises a ring-shaped sheet metal stamping having a sprung transverse web through which passes the fixed contact wire.

6. A thermometer as defined in claim 1 wherein the upper end of the contact wire passes to the outside of the glass tube and is fused from the outside into the glass tube wall near the upper end thereof.

7. A thermometer as defined in claim 6 wherein the sliding contact wire is slightly arched by axial compression.

8. A thermometer as defined in claim 1 wherein
said bearing means includes an upper bearing cage and a lower bearing cage located at the upper and lower ends of the lead screw, respectively,
said upper bearing cage includes a terminal for an external current supply lead to the sliding contact wire.

9. A thermometer as defined in claim 8 wherein
the lead screw has a pointed bottom end and the bearing cages have a cross-sectional shape which prevents rotation thereof within the glass tube,
the lower bearing cage comprises a back which is formed with an inwardly angled locating lug with a hole for the passage therethrough of the lead screw and a similarly inwardly angled portion providing a seating surface for the pointed bottom end of the lead screw.

10. A thermometer as defined in claim 9 wherein
the pointed end of the lead screw has a blunted nose.

11. A thermometer as defined in claim 10 wherein
the sliding contact wire is clamped to the lower bearing cage by a clamping lug which is integrally formed in a side wall of the lower bearing cage.

12. A thermometer as defined in claim 11 wherein
said lower bearing cage includes an eyelet holder integrally formed therewith to guide the contact wire.

13. A thermometer as defined in claim 8 wherein
the upper bearing cage includes a U-shaped sheet metal member comprising a back wall placed parallel to the lead screw axis and shanks provided with bearing bosses for guiding the lead screw.

14. A thermometer as defined in claim 13 wherein
clamping lugs are integrally formed with a back wall of the upper bearing cage for securing the end of the current supply lead and the upper end of the sliding contact wire.

15. A thermometer as defined in claim 14 wherein
the external current supply lead and the sliding contact wire are both held in the same clamping lug.

References Cited

UNITED STATES PATENTS

| | | | |
|---|---|---|---|
| 489,259 | 1/1893 | Maxim et al. | 73—343 |
| 509,056 | 11/1893 | Tunnard | 73—343 |
| 2,018,220 | 10/1935 | Morrison | 73—362 |
| Re. 22,637 | 3/1941 | Keinath | 73—362 |

LOUIS R. PRINCE, Primary Examiner

W. A. HENRY II, Assistant Examiner